(12) United States Patent
Tagano (10) Patent No.: US 8,437,119 B2
(45) Date of Patent: May 7, 2013

(54) ELECTRICAL JUNCTION BOX

(75) Inventor: Masahiro Tagano, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 205 days.

(21) Appl. No.: 13/085,078

(22) Filed: Apr. 12, 2011

(65) Prior Publication Data

US 2012/0106034 A1    May 3, 2012

(30) Foreign Application Priority Data

Oct. 27, 2010    (JP) ................ 2010-240917

(51) Int. Cl.
*H02B 1/32* (2006.01)

(52) U.S. Cl.
USPC ........... 361/657; 361/641; 361/642; 361/643; 361/658; 361/730; 361/732; 174/50; 174/58; 174/60; 174/17 R; 174/135; 174/520; 174/559; 174/560; 174/561; 174/563; 439/76.1; 439/76.2; 439/521; 220/3.2; 220/3.8; 220/326; 363/16; 363/20; 363/98; 363/132

(58) Field of Classification Search .......... 361/600, 361/601, 641–643, 657–659, 679.01, 730, 361/732; 174/50, 50.52, 58–60, 17 R, 17.08, 174/135, 520, 559–563; 439/76.1, 76.2, 439/521, 367, 686, 949, 604; 220/3.2, 3.8, 220/4.02, 4.21, 4.01, 4.31, 323, 326, 3.94, 220/4.24, 324, 3.3, 3.4, 3.5, 3.6, 3.7, 3.9; 363/16, 20, 98, 132, 235, 319; 248/56

See application file for complete search history.

(56) References Cited

U.S. PATENT DOCUMENTS

| 4,959,018 | A | * | 9/1990 | Yamamoto et al. ........... 439/76.1 |
| 5,405,035 | A | * | 4/1995 | Kato ............................... 220/3.8 |
| 5,515,988 | A | * | 5/1996 | Oda ................................ 220/3.8 |
| 5,531,345 | A | * | 7/1996 | Nakamura et al. ............. 220/3.8 |
| 5,702,021 | A | * | 12/1997 | Ito .................................. 220/326 |
| 5,775,579 | A | * | 7/1998 | Kardum et al. ............... 232/43.1 |
| 5,788,529 | A | * | 8/1998 | Borzi et al. .................... 439/364 |
| 5,903,444 | A |   | 5/1999 | Sekido et al. |
| 5,967,819 | A | * | 10/1999 | Okada ........................... 439/212 |
| 5,995,380 | A | * | 11/1999 | Maue et al. .................... 361/826 |

(Continued)

FOREIGN PATENT DOCUMENTS

| JP | A 09-151916 | 6/1997 |
| JP | A 11-135966 | 5/1999 |
| JP | A 2007-282401 | 10/2007 |
| JP | A 2009-165309 | 7/2009 |

*Primary Examiner* — Michail V Datskovskiy (74) *Attorney, Agent, or Firm* — Oliff & Berridge, PLC (57) ABSTRACT

To provide an electrical junction box that can maintain a stable assembly condition between a box main body and a cover member, even if locking mechanisms are not provided on a whole periphery of the electrical junction box. An electrical junction box includes a box main body and a cover member. One of the box main body and the cover member is provided on at least a single of side portions of the one peripheral wall with a locking mechanism. An elastic rib that protrudes from an inner peripheral surface of the one peripheral wall at one of the side portions is pressed onto a fitting projection piece. A side portion is provided with a support wall that is opposed to and spaced apart from the inner peripheral surface. The fitting projection piece is held in a space between the inner peripheral surface and the support wall.

4 Claims, 9 Drawing Sheets

U.S. PATENT DOCUMENTS

| | | | |
|---|---|---|---|
| 6,077,102 A * | 6/2000 | Borzi et al. | 439/364 |
| 6,121,548 A * | 9/2000 | Matsuoka | 174/59 |
| 6,224,426 B1 * | 5/2001 | Kaneko | 439/620.29 |
| 6,540,543 B1 * | 4/2003 | Watanabe | 439/354 |
| 6,561,822 B2 * | 5/2003 | Depp et al. | 439/76.2 |
| 6,570,088 B1 * | 5/2003 | Depp et al. | 174/50 |
| 6,629,619 B2 * | 10/2003 | Sato et al. | 220/4.02 |
| 6,659,792 B2 * | 12/2003 | Saka et al. | 439/367 |
| 6,822,163 B2 * | 11/2004 | Saneto et al. | 174/50 |
| 6,848,916 B2 * | 2/2005 | Nakayama et al. | 439/76.2 |
| 6,919,509 B2 * | 7/2005 | Oda | 174/59 |
| 6,923,660 B2 * | 8/2005 | Takeuchi | 439/76.2 |
| 6,926,545 B2 * | 8/2005 | Fukamachi et al. | 439/157 |
| 6,992,248 B1 * | 1/2006 | Dunbar et al. | 174/50 |
| 7,017,764 B2 * | 3/2006 | Okada | 220/3.2 |
| 7,075,006 B2 * | 7/2006 | Nojima et al. | 174/58 |
| 7,179,990 B2 * | 2/2007 | Kanazawa | 174/50 |
| 7,420,822 B2 * | 9/2008 | Janisch | 361/826 |
| 7,459,630 B2 * | 12/2008 | Pinol Pedret et al. | 174/50 |
| 7,500,856 B2 * | 3/2009 | Iizuka | 439/76.2 |
| 7,566,829 B2 * | 7/2009 | Nakayama et al. | 174/50 |
| 7,586,038 B2 * | 9/2009 | Kanamaru et al. | 174/50 |
| 7,642,452 B2 * | 1/2010 | Kanazawa et al. | 174/50 |
| 7,666,006 B2 * | 2/2010 | Hashikura et al. | 439/76.2 |
| 7,771,212 B2 * | 8/2010 | Miyamoto | 439/76.2 |
| 7,802,998 B2 * | 9/2010 | Taguchi et al. | 439/76.2 |
| 7,893,364 B2 * | 2/2011 | Oda | 174/520 |
| 7,934,934 B2 * | 5/2011 | Taniguchi et al. | 439/76.1 |
| 8,163,994 B2 * | 4/2012 | Taniguchi et al. | 174/50 |
| 2002/0084271 A1 * | 7/2002 | Sato et al. | 220/3.8 |
| 2006/0040526 A1 * | 2/2006 | Shirota | 439/76.2 |
| 2008/0149387 A1 * | 6/2008 | Oda | 174/520 |
| 2009/0221160 A1 * | 9/2009 | Taniguchi et al. | 439/76.2 |

* cited by examiner

ELECTRICAL JUNCTION BOX

BACKGROUND

This application claims the benefit of Japanese Patent Application No. 2010-240917 filed Oct. 27, 2010, the contents of which are hereby incorporated by reference.

The exemplary embodiments described herein detail for illustrative purposes and are subject to many variations in structure and design. It should be emphasized, however, that the present invention is not limited to a particularly disclosed embodiment shown or described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "an" and "a" herein do not denote a limitation of quantity, but rather denote the presence of at least one of the referenced item. This disclosure generally relates to an electrical junction box in which a cover member is attached to a box main body.

Heretofore, in some electrical junction boxes such as junction boxes to be mounted on a motor vehicle or the like, a cover member such as a lower cover or an upper cover is attached to a box main body that contains electrical components in order to prevent water or dust particles from entering the electrical junction box. As disclosed in, for example, JP 2007-282401 A (Patent Document 1) or JP 2009-165309 A (Patent Document 2), the box main body and cover member are coupled to each other by a plurality of locking mechanisms provided on a peripheral portion on the electrical junction box.

It is preferable that the locking mechanisms are arranged uniformly in balance on the peripheral portion of the electrical junction box in order to stably interconnect the box main body and cover member. However, in the electrical junction box to be mounted on a motor vehicle, there are some positions on which the locking mechanisms cannot be provided on account of a layout of adjacent parts. A staggering or rattling action will be caused in a clearance between the box main body and the cover member at a position on which the locking mechanisms are not provided. This will cause problems that water or dust particles may enter the clearance or that the locking mechanism may be subject to any stress that damages the locking mechanism.

SUMMARY

In view of the above problems, an object of the exemplary embodiments is to provide an electrical junction box that can maintain a stable assembly condition between a box main body and a cover member, even if locking mechanisms for the box main body and cover member cannot be provided on a whole periphery of the electrical junction box.

A first aspect of the exemplary embodiments is directed to an electrical junction box. The electrical junction box includes a box main body that contains and holds electrical components and a cover member that covers an opening in the box main body. Peripheral walls of the box main body and the cover member are fitted in and locked on each other by a locking mechanism. One of the box main body and the cover member is provided with a fitting projection piece that protrudes from an end of one of the peripheral walls. The fitting projection piece is fitted into a side of an inner peripheral surface of the other peripheral wall of the other of the box main body and the cover member. The other of the box main body and the cover member is provided on at least a single of side portions of the other peripheral wall with the locking mechanism. An elastic rib that protrudes from the inner peripheral surface of the other peripheral wall at the single side portion is pressed onto the fitting projection piece. The other of the box main body and the cover member is provided on the other side portion of the other peripheral wall, which is not provided with the locking mechanism, with a support wall that is opposed to and spaced apart from the inner peripheral surface of the other peripheral wall. The fitting projection piece is held in a space between the inner peripheral surface of the other peripheral wall and the support wall.

According to the electrical junction box in the first aspect of the exemplary embodiments, since the elastic rib is pressed onto the fitting projection piece on the side portion on which the locking mechanism is provided, it is possible to enhance a fixing force between the box main body and the cover member. On the other hand, since the fitting projection piece is inserted into and held in the space between the inner peripheral surface of the other peripheral wall and the support wall, it is possible to prevent the cover member from staggering with respect to the box main body. Thus, even if the locking mechanisms cannot be provided on the entire side portions in a manner of maintaining a good balance, it is possible to stably couple the cover member to the box main body, thereby preventing water or dust particles from entering the electrical junction box and lowering a possibility that the locking mechanism is damaged on account of the staggering action of the cover member.

The cover member in the first aspect may be either a so-called lower cover that is coupled to the box main body from its lower side or a so-called upper cover that is coupled to the box main body from its upper side. The fitting projection piece, elastic rib, and support wall may be provided selectively on either the box main body or the cover member in view of a fitting condition between the box main body and the cover member. That is, in view of a waterproofing function, it is preferable that the lower cover is fitted inside the peripheral wall of the box main body. Accordingly, if the cover member is the lower cover, it is preferable that the fitting projection piece is provided on the lower cover so as to be inserted inside the inner peripheral surface of the peripheral wall of the box main body and that the elastic rib and support wall are provided on the box main body. On the contrary, if the cover member is the upper cover, it is preferable that the fitting projection piece is provided on the box main body and the elastic rib and support wall are provided on the upper cover, since it is preferable that the upper cover is fitted on an outer side of the box main body.

A second aspect of the exemplary embodiments is directed to the electrical junction box according to the first aspect. In the electrical junction box in the second aspect, a pair of elastic ribs that are opposed to each other are provided on the inner peripheral surface of the other peripheral wall and a surface of the support wall opposed to the other peripheral wall. The fitting projection piece is held in a space between protruding end surfaces of the pair of elastic ribs.

According to the electrical junction box in the second aspect of the exemplary embodiments, it is possible to reduce a force of inserting the fitting projection piece in the space between the peripheral wall and the support wall. It is also possible to absorb errors in dimension between the fitting projection piece and the peripheral wall and support wall that pinch the fitting projection piece. Thus, it is possible to more easily couple the cover member to the box main body.

A third aspect of the exemplary embodiments is directed to the electrical junction box according to the first or second aspect. In the electrical junction box in the third aspect, the locking mechanism includes an locking piece provided on one of the box main body and the cover member, and an locking projection provided on the other of the box main body and the cover member. A staggering stopper rib is provided on locking surfaces of the locking projection and the locking piece.

According to the electrical junction box in the third aspect of the exemplary embodiments the locking projection and locking piece are engaged with each other across the staggering stopper rib. Thus, it is possible to decrease the clearance between the locking projection and the locking piece, thereby lowering their staggering actions in the locking mechanism. In result, it is possible to more lower the staggering action of the cover member.

According to the exemplary embodiments, one of the box main body and the cover member is provided with the fitting projection piece that is fitted into the inner peripheral side of the other peripheral wall. The other of the box main body and the cover member is provided on the side portion, on which the locking mechanism is provided, with the elastic rib that is pressed onto the fitting projection piece. The other of the box main body and the cover member is provided on the side portion, on which the locking mechanism is not provided, with the support wall that is opposed to the inner peripheral surface of the other peripheral wall. The fitting projection piece is held in the space between the inner peripheral surface of the other peripheral wall and the support wall. Thus, even if the locking mechanisms cannot be provided on the entire side portions, it is possible to stably maintain the coupling condition between the box main body and the cover member. In result, it is possible to lower a possibility that water or dust particles enter the electrical junction box on account of the staggering action of the cover member or that the locking mechanism is damaged on account of the staggering action.

DETAILED DESCRIPTION OF EMBODIMENTS

An exemplary apparatus for an electrical junction box is described herein. In the following description, for purposes of explanation, numerous specific details are set forth in order to provide a thorough understanding of the disclosed electrical junction box. It will be apparent, however, to one skilled in the art, that the present apparatus may not include these specific details. Reference in the specification to "one embodiment" or "an embodiment" means that a particular feature, structure, or characteristic described in connection with the embodiment is included in at least one embodiment. The appearance of the phrase "in one embodiment" in various places of the specification are not necessarily all referring to the same embodiment.

Figure 1:
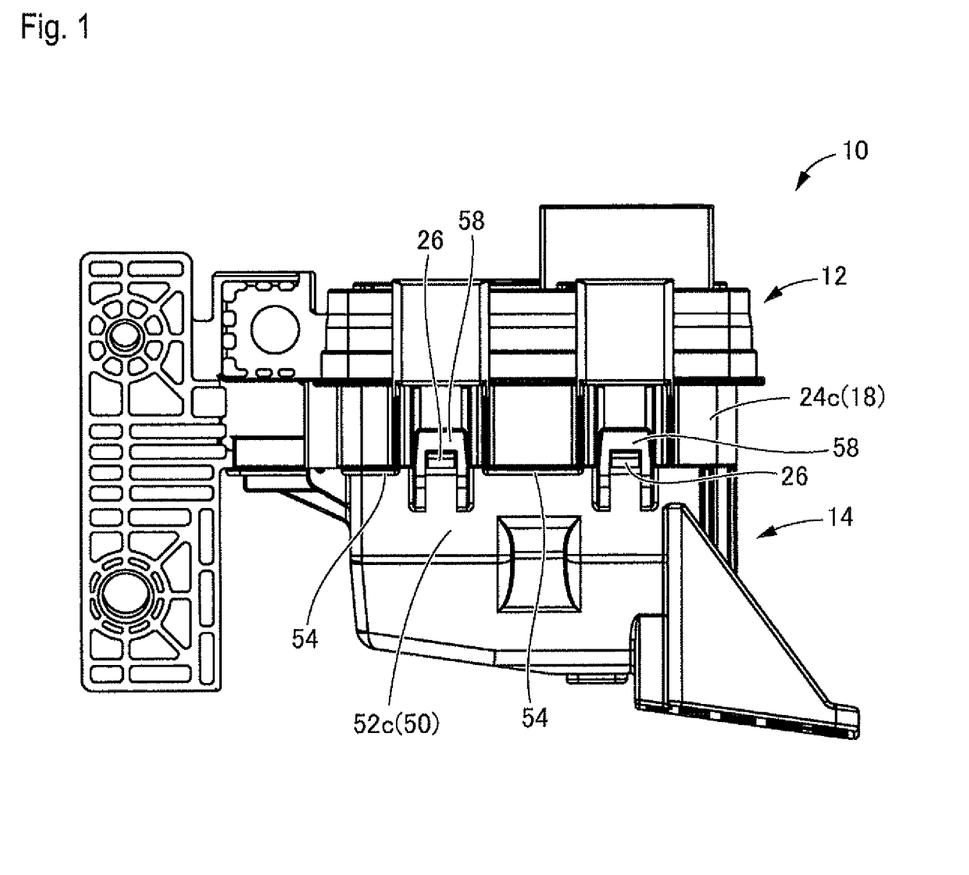
FIG. 1 is a side elevation view of an embodiment of an electrical junction box in accordance with the present invention.
Figure 2:
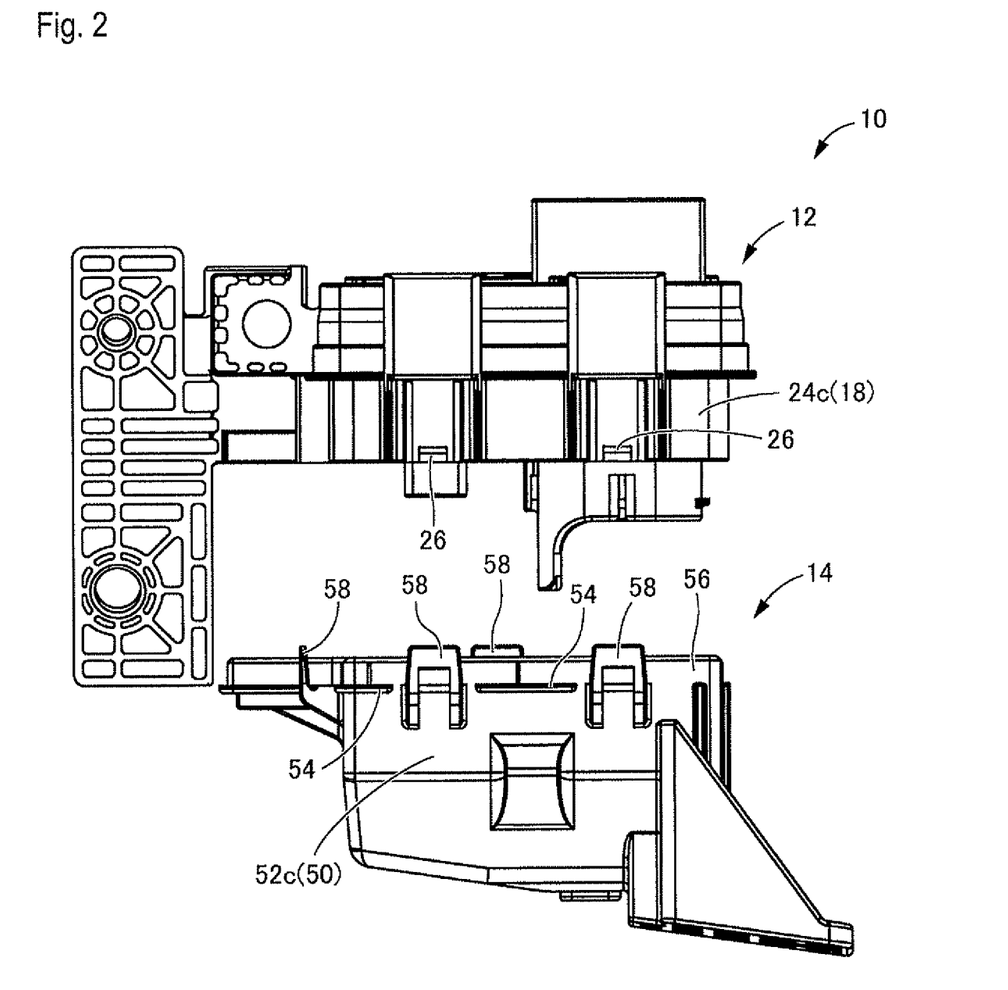
FIG. 2 is an exploded side elevation view of the electrical junction box shown in FIG. 1.

FIGS. 1 and 2 show an embodiment of an electrical junction box 10 in accordance with the present invention. FIG. 1 shows the electrical junction box 10 in an assembled condition while FIG. 2 shows the electrical junction box 10 in an exploded condition. The electrical junction box 10 includes a box main body 12 and a lower cover 14 that constitutes a cover member. Hereinafter, the word "lower" or the words "a lower direction" means the lower position or a lower direction in FIGS. 1 and 2, except where specifically noted.

Figure 3:
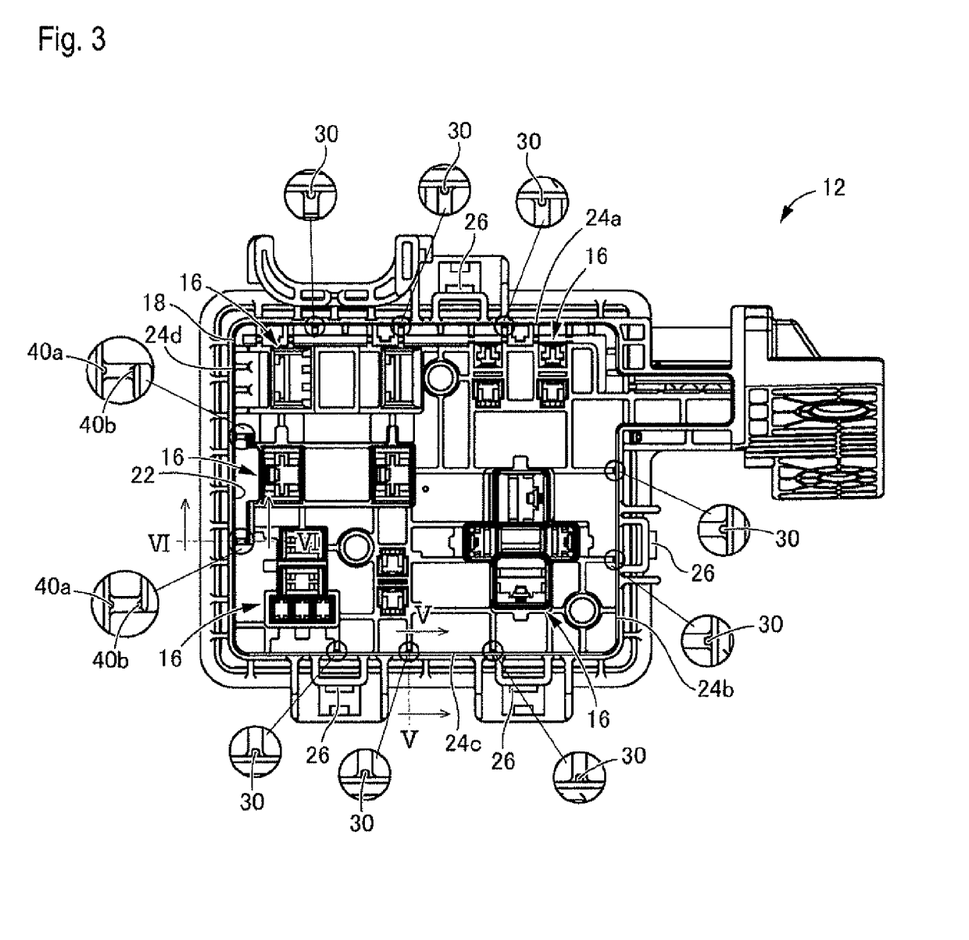
FIG. 3 is a bottom plan view of a box main body that constitutes a part of the electrical junction box shown in FIG. 1.
Figure 4:
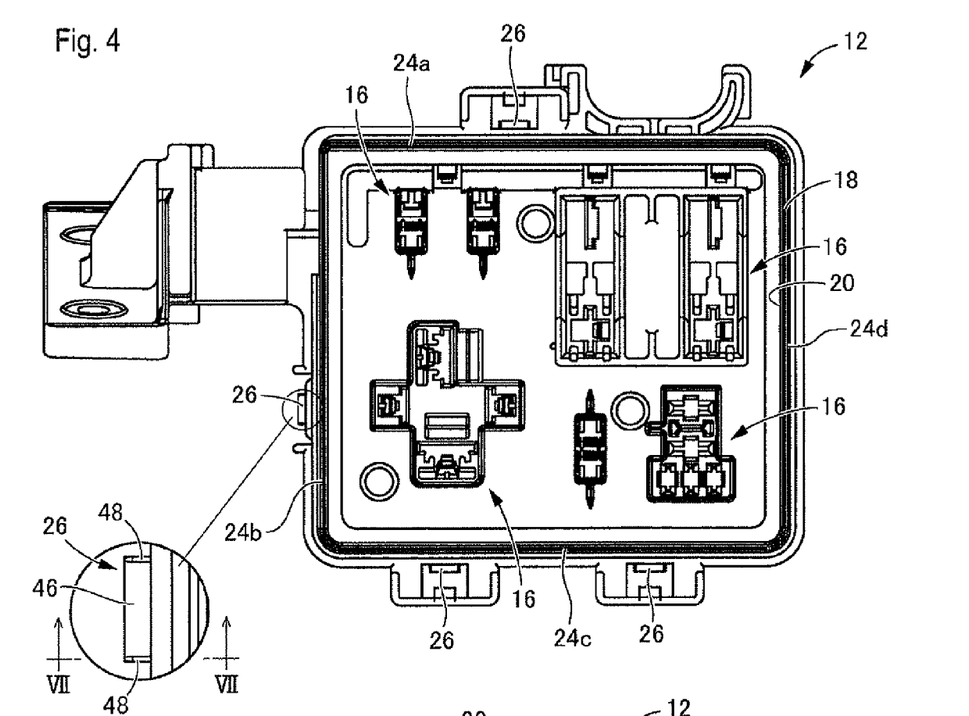
FIG. 4 is a top plan view of the box main body shown in FIG. 3.

FIG. 3 shows a bottom plan view of the box main body 12 (at a side of the lower cover 14) while FIG. 4 shows a top plan view of the box main body 12 (at a side opposite from the lower cover 14). The box main body 12 is a molded product made of a synthetic resin. A plurality of electrical components 16 are arranged suitably in the box main body 12. Other electrical components such as relays and fuses (not shown) are connected to the electrical components 16 to be contained and held in the box main body 12. The box main body 12 is provided on its outer periphery with a peripheral wall 18 that protrudes upper and lower directions and extends in a peripheral direction. A section surrounded by the peripheral wall 18 is opened upward to define an upper opening 20 and is opened downward to define a lower opening 22.

The box main body 12 is formed into a rectangular parallelepiped configuration. Thus, the peripheral wall 18 has first to fourth side portions 24a to 24d. The first and third side portions 24a and 24c are opposed to each other while the second and fourth side portions 24b and 24d are opposed to each other. The first to third side portions 24a to 24c are provided with suitable numbers of locking projections 26 that constitute locking mechanisms and are spaced apart from one another by suitable distances in a peripheral direction of the peripheral wall 18 (in the present embodiment, a single locking projection 26 on each of the first and second side portions 24a and 24b, and two locking projections 26 on the third side portion 24c). On the other hand, the fourth side portion 24d is not provided with the locking projection 26.

As shown in FIG. 3, the first to third side portions 24a to 24c, on which the locking projections 26 are provided, are provided with a plurality of elastic ribs 30 that are spaced apart from one another by suitable distances in a peripheral direction of the peripheral wall 18 (in the present embodiment, three elastic ribs 30 on the first side portion 24a, two elastic ribs 30 on the second side portion 24b, and three elastic ribs 30 on the third side portion 24c). On the other hand, the fourth side portion 24d is not provided with the elastic rib 30.

Since the elastic ribs have the same configurations mutually, the elastic rib 30 provided on the third side portion 24c shown in FIG. 5 will be explained below as an example. An upper side in FIG. 5 corresponds to a lower side (a side of the lower cover 14) in FIGS. 1 and 2. The elastic ribs 30 are integrated with the peripheral wall 18. Each of the elastic ribs 30 protrudes from an inner peripheral surface 32 of the peripheral wall 18 and extends straightly through a whole length of the rib in a protruding direction of the peripheral wall 18 from a bottom surface 33 of the box main body 12. Each elastic rib 30 is provided on a lower end edge (an upper end edge in FIG. 5) with a guide portion 34 in which a dimension protruding from the inner peripheral surface 32 becomes great gradually as the guide portion 34 extends toward the bottom surface 33. The elastic rib 30 has a constant shape in cross section through a substantially whole length except the guide portion 34. The dimension of the elastic rib 30 protruding from the inner peripheral surface 32 is set so that the elastic rib 30 can be pressed onto a fitting projection piece 56 (mentioned after) on the lower cover 14 that is positioned in and secured to the box main body 12 by locking mechanisms 26 and 58.

On the other hand, a support wall 36 is provided on the fourth side portion 24d on which the locking projection 26 is not provided. The support wall 36 protrudes from the bottom surface 33 of the box main body 12 so as to be spaced apart from the inner peripheral surface 32 of the peripheral wall 18 by a given distance. The support wall 36 has substantially the same dimension in height protruding from the bottom surface 33 as that of the peripheral wall 18. Although the support wall 36 may be formed on the box main body 12 individually, the support wall 36 in the present embodiment is formed by utilizing a wall or the like of an electrical component mounting section 16 that protrudes from the bottom surface 33, thereby enhancing an efficiency in space and facilitating a design.

Figure 6:
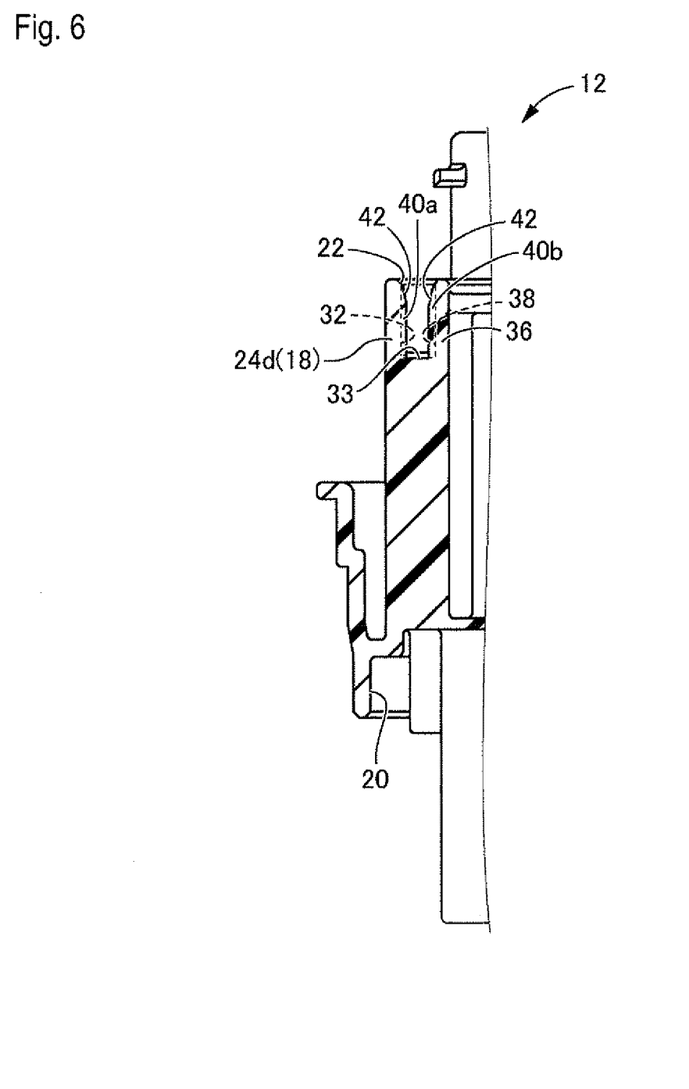
FIG. 6 is a section view of the box main body taken along lines VI-VI in FIG. 3.

As shown in FIG. 6, elastic ribs 40a and 40b are provided on the inner peripheral surface 32 of the peripheral wall 18 and a surface 38 of the support wall 36 opposed to the inner peripheral surface 32. An upper side in FIG. 6 corresponds to a lower side (a side of the lower cover 14) in FIGS. 1 and 2. The elastic ribs 40a and 40b protrude from the inner peripheral surface 32 of the peripheral wall 18 and the opposed surface 38 of the support wall 36 so as to approach to each other and extend in a direction extending from the common bottom surface 33 of the peripheral wall 18 and support wall 36. The elastic ribs 40a and 40b have the substantially same configurations. The elastic ribs 40a and 40b are provided on their lower end edges (upper end edges in FIG. 6) with guides portions 42, 42 in which dimensions protruding from the inner peripheral surface 32 and the opposed surface 38 become great gradually as the elastic ribs 40a and 40b approach to the bottom surface 33. The elastic ribs 40a and 40b have constant shapes in cross section except the guide portions 42, 42.

The elastic ribs 40a and 40b are opposed to each other and are spaced apart from each other by a given distance. A clearance between the elastic ribs 40a and 40b is set to be equal to or slightly greater than a dimension in thickness of a fitting projection 56 (mentioned after) of the lower cover 14 so that the fitting projection 56 can be inserted into the clearance without requiring a particular pressing force.

As shown in FIG. 3, in the present embodiment, two pairs of elastic ribs 40a and 40b are provided on the fourth side portion 24d and are spaced apart from each other by a given distance in the peripheral direction of the peripheral wall 18. The support wall 36 may be provided individually in correspondence with the elastic ribs 40a and 40b. Alternately, the support wall 36 may be formed into an elongated configuration that extends in the peripheral direction of the peripheral wall 32 and a plurality of elastic ribs 40b may be provided on the single elongated support wall 36.

Figure 7:
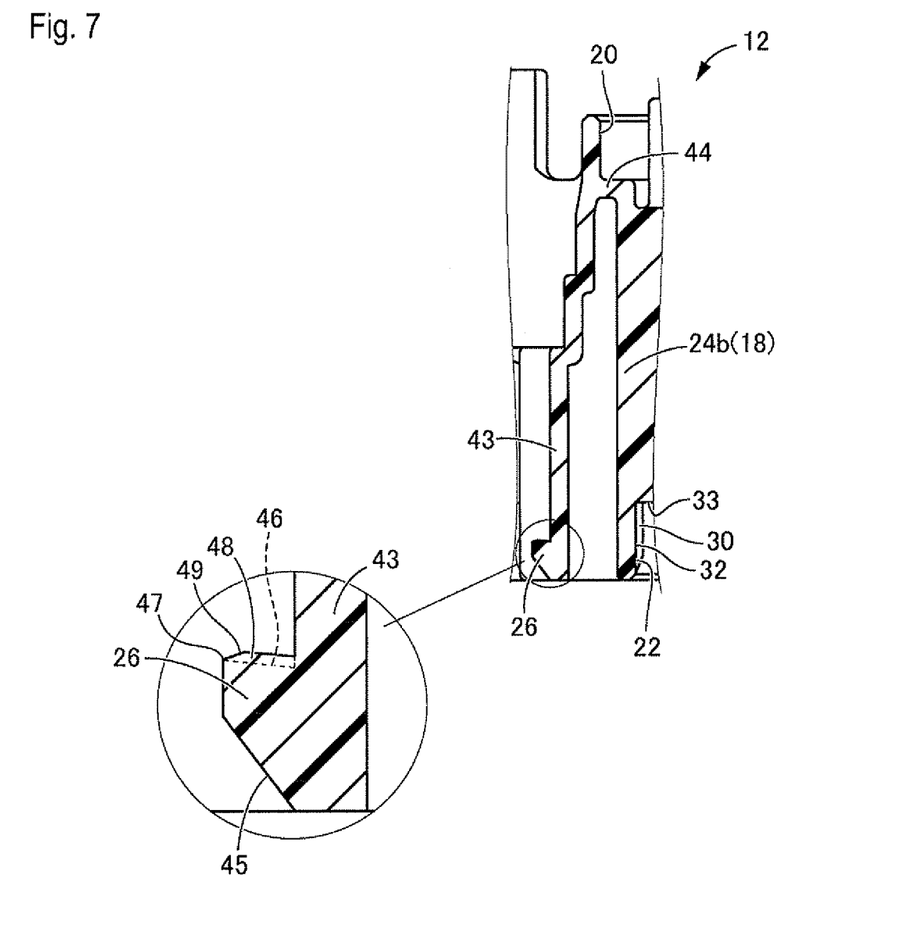
FIG. 7 is a section view of the box main body taken along lines VII-VII in FIG. 4.

FIG. 7 shows an example of the second side portion 24b. The locking projections 26 provided on the first to third side portions 24a to 24c are integrated with leaf springs 43 that protrude from the peripheral wall 18. Each leaf spring 43 is coupled through an upper end coupling portion 44 to the peripheral wall 18 and is integrated with the peripheral wall 18 so as to extend downward from the coupling portion 44 in a plate-like configuration. A lower end of the leaf spring 43 is provided on its free end at a side opposite from the coupling portion 44 with the locking projection 26. Thus, the locking projection 26 is located at a position in height equal to the lower end of the peripheral wall 18. The locking projection 26 is formed into a rectangular block-like configuration. The locking portion 26 is provided on its lower surface with a slant surface 45 that a dimension protruding from the leaf spring 43 that becomes great gradually as the slant surface 45 extends toward an upper side (an upper side in FIG. 7). On the other hand, an upper surface of the locking projection 26 defines a locking surface 46. The locking surface 46 defines a slant surface that gradually inclines upward (upward in FIG. 7) as the locking surface 46 extend outward (to a left side in FIG. 7) from the leaf spring 43 and defines a flat surface through a whole part except staggering stopper ribs 48, 48 (mentioned after).

As shown in enlarged views in FIGS. 4 and 7, the locking surface 46 is provided on its both end edges with staggering stopper ribs 48, 48. The staggering stopper ribs 48, 48 are integrated with the locking projections 26, extend on the locking surface 46 from the locking projections 26 in the protruding direction (right and left directions in FIG. 7) of the locking projections 26, and reach outer edge 47 of the locking surface 46. A dimension in height of each staggering stopper rib 48 that protrudes from the locking surface 46 (a protruding dimension in a direction perpendicular to the locking surface 46) is constant through a whole length in a longitudinal direction (in right and left directions in FIG. 7) except an extending end 49 of the staggering stopper rib 48 that extends from the leaf sprig 43. The staggering stopper rib 48 inclines upward in association with an inclination of the locking surface 46 as the staggering stopper rib 48 is spaced apart from the leaf spring 43 (in a left direction in FIG. 7). A dimension of the staggering stopper rib 48 that protrudes from the locking surface 46 becomes small gradually at an extending end 49 as the staggering stopper rib 48 extends toward the outer edge 47 of the locking surface 46.

Figure 8:
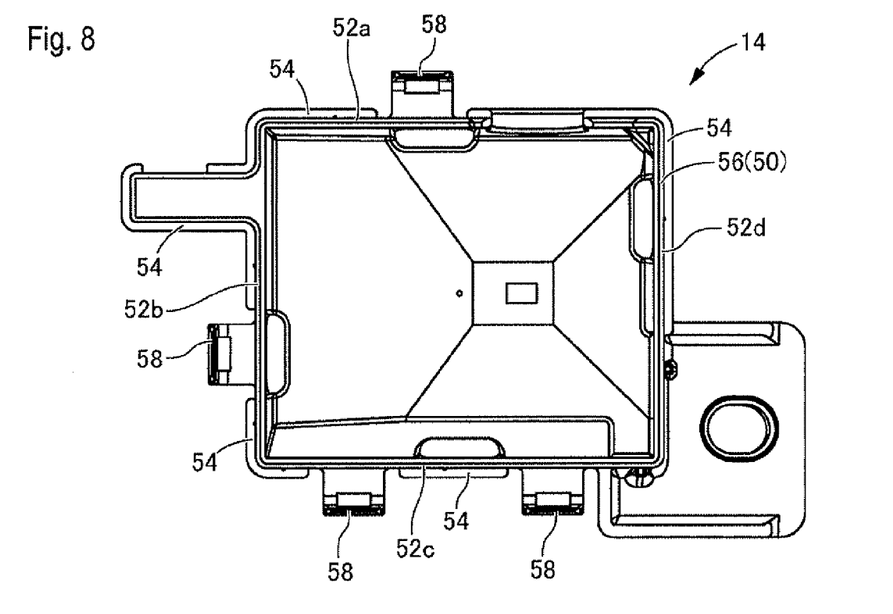
FIG. 8 is a top plan view of a cover member that constitutes a part of the electrical junction box shown in FIG. 1.

On the other hand, FIG. 8 shows a top plan view of the lower cover 14. The lower cover 14 is a molded product made of a synthetic resin. The lower cover 14 is formed into a substantially rectangular box-like configuration that corresponds to the box main body 12. Thus, the lower cover 14 is provided on its peripheral wall 50 with first to fourth side portions 52a to 52d that correspond to the first to fourth side portions 24a to 24d of the box main body 12.

The peripheral wall 50 is provided on its upper end with a plurality of positioning ribs 54 that protrude outward from the lower cover 14 and extend and are spaced apart from one another in a peripheral direction of the peripheral wall 50. As shown in FIG. 2, a section that extends from the upper end of the peripheral wall 50 to protrude upward from the positioning ribs 54 defines a fitting projection piece 56.

Furthermore, the first to third side portions 52a to 52c are provided at a position corresponding to the locking projections 26 of the box main body 12 with locking pieces 58 that constitute the locking mechanisms in cooperation with the locking projections 26. As shown in FIG. 2, the locking pieces 58 are integrated with an outer surface of the peripheral wall 50 and protrude outward from the peripheral wall 50 so as to form frame-like configurations that protrude upward. The locking pieces 58 protrude over the positioning ribs 54.

Figure 9:
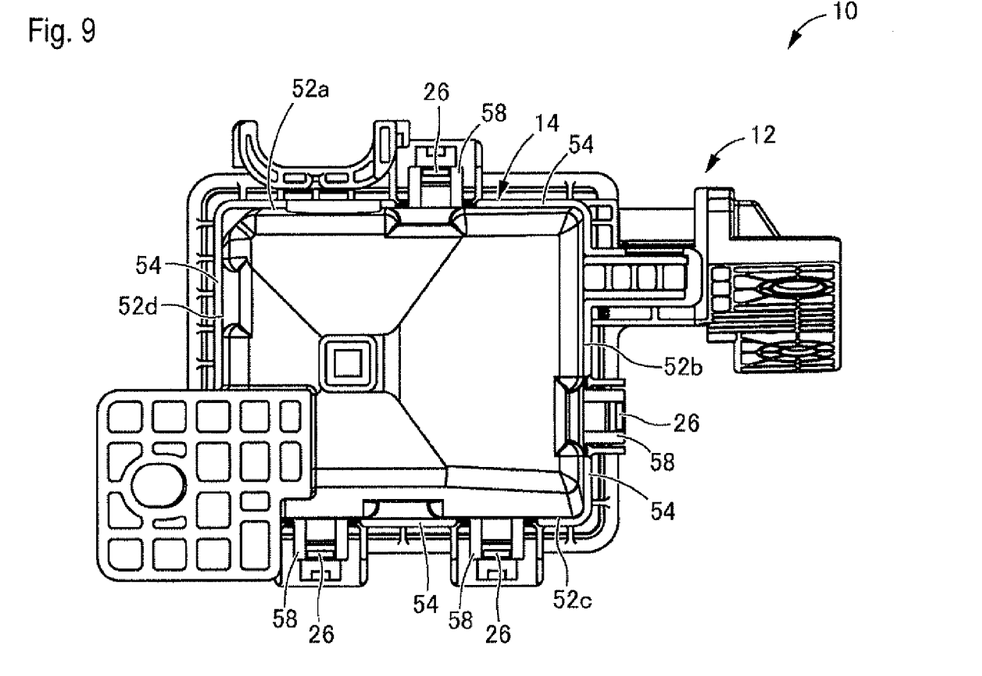
FIG. 9 is a bottom plan view of the electrical junction box shown in FIG. 1.

As shown in FIG. 1, the lower cover 14 constructed above is fitted to the box main body 12 from its lower side. Upon this fitting operation, the locking projection pieces 56 of the lower cover 14 are fitted into the side of the inner peripheral surface 32 on the peripheral wall 18 of the box main body 12. At the same time, the plural locking pieces 58 slide over the locking projections 26 of the box main body 12. When the locking projections 26 enter the frame of the fitting projection piece 56, the locking projections 26 and locking pieces 58 are engaged with one another. Since the staggering stopper ribs 48 of the locking projections 26 reduce their dimensions protruding from the locking surface 46 as the extending end portions 49 of the staggering stopper ribs 48 extend toward the outer edge 47 of the locking surface 46 (see FIG. 7), an interference between the locking pieces 58 and the staggering stopper ribs 48 can be lowered when the locking pieces 58 slide over the locking projections 26. Thus, the box main body 12 and lower cover 14 are engaged with each other. In result, as shown in FIG. 9, the lower side opening 22 (see FIG. 3) of the box main body 12 is covered with the lower cover 14. An upper cover (not shown) is fitted on the upper side of the box main body 12. The upper opening 20 of the box main body 12 is covered with the upper cover.

Figure 5:
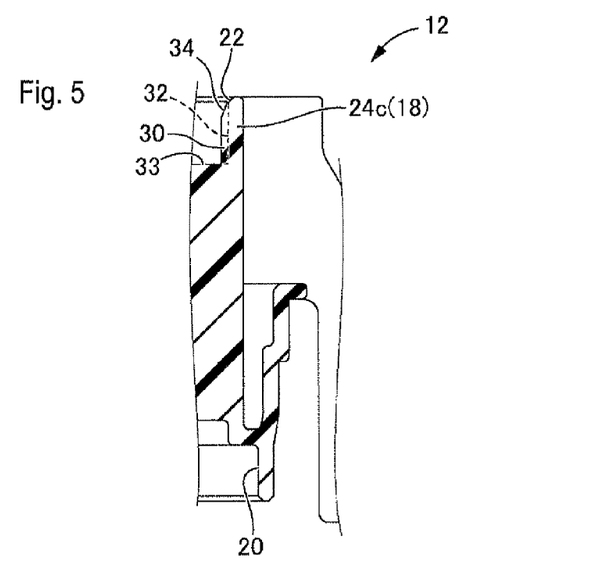
FIG. 5 is a section view of the box main body taken along lines V-V in FIG. 3.
Figure 10:
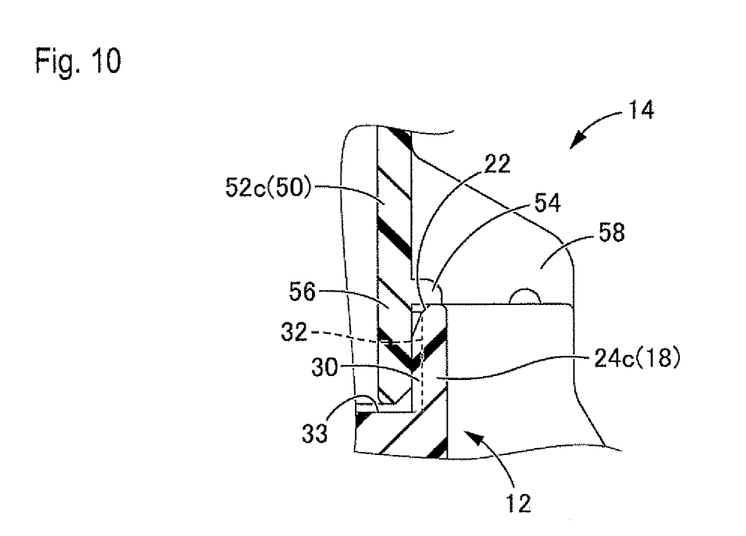
FIG. 10 is a section view of a main part of the box main body shown in FIG. 5; illustrating the box main body to which the cover member is attached.

FIG. 10 is a section view of a main part of the box main body 12 shown in FIG. 5, illustrating the box main body 12 to which the lower cover 14 is attached. When the positioning ribs 54 contact with the upper end surface of the peripheral wall 18 of the box main body 12, the lower cover 14 is positioned on the box main body 12. An upper side in FIG. 10 corresponds to a side of the lower cover 14. FIG. 10 shows an example of the third side portion 24*c*. When the lower cover 14 is coupled to the box main body 12, the plural elastic ribs 30 provided on the first to third side portions 24*a* to 24*c* of the box main body 12 are pressed onto the fitting projection pieces 56 of the lower cover 14, respectively.

Figure 11:
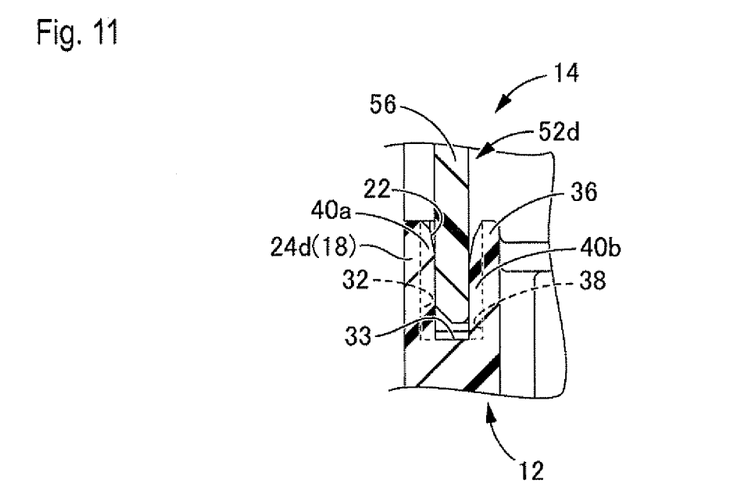
FIG. 11 is a section view of a main part of the box main body shown in FIG. 6, illustrating the box main body to which the cover member is attached.

On the other hand, FIG. 11 is a section view of a main part of the box main body 12 shown in FIG. 6, illustrating the box main body 12 to which the lower cover 14 is attached. The fitting projection piece 56 on the fourth side portion 52*d* of the lower cover 14 is inserted into a clearance between the inner peripheral surface 32 of the peripheral wall 18 at the fourth side portion 24*d* of the box main body 12 and the opposed surface 38 of the support wall 36. An upper side in FIG. 11 corresponds to a side of the lower cover 14. Thus, the fitting projection piece 56 at the fourth side portion 52*d* is pinched between the peripheral wall 18 of the box main body 12 and the support wall 36. Particularly, in the present embodiment, since the elastic ribs 40*a* and 40*b* protrude from the peripheral wall 18 and support wall 36, the fitting projection piece 56 is inserted into and held in a clearance between the protruding surfaces of the elastic ribs 40*a* and 40*b*. Since a spacing distance between the elastic ribs 40*a* and 40*b* is set to be substantially equal to a dimension in thickness of the fitting projection piece 56, the fitting projection piece 56 is readily inserted into the clearance between the opposed surfaces of the electric ribs 40*a* and 40*b* without requiring any special inserting force.

Figure 12:
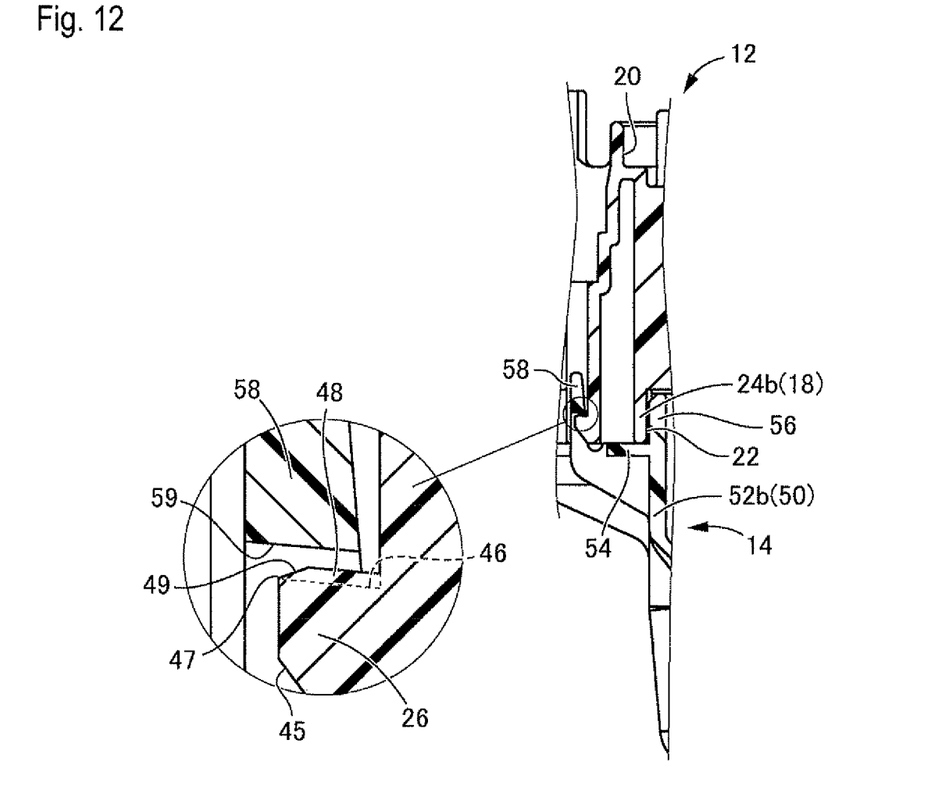
FIG. 12 is a section view of a main part of the box main body shown in FIG. 7, illustrating the box main body to which the cover member is attached.

Furthermore, FIG. 12 is a section view of a main part of the box main body 12 shown in FIG. 7, illustrating the box main body 12 to which the lower cover 14 is attached. Under a locking condition between the box main body 12 and the lower cover 14, the locking projections 26 of the box main body 12 are fitted into the frames of the locking pieces 58 of the lower cover 14. A lower side in FIG. 12 corresponds to a side of the lower cover 14. Thus, the staggering stopper rib 48 provided on each locking projection 26 is disposed in a clearance between the locking surface 46 of each locking projection 26 and the locking surface 59 of each locking piece 58. The locking surface 46 of the locking projection 26 and the locking surface 59 of the locking piece 58 are engaged with each other across the staggering stopper rib 48.

According to the electrical junction box 10 constructed above, the elastic ribs 30 that protrude from the peripheral wall 18 are pressed onto the fitting projection pieces 56 of the lower cover 14 at the side portions 24*a* to 24*c* on which the locking mechanism 26 is provided in the box main body 12. Thus, it is possible to more firmly couple the lower cover 14 to the box main body 12 in addition to a locking action of the locking mechanisms 26 and 58. Furthermore, since the fitting projection pieces 56 are pinched between the peripheral wall 18 and the support wall 36 opposed to the peripheral wall 18 at the side portion 24*d* on which the locking mechanism 26 is not provided in the box main body 12, it is possible to restrain the lower cover 14 from staggering. Thus, even if the side portion 24*d* is not provided with the locking mechanism 26, it is possible to ensure a fixing force for the lower cover 14, thereby coupling the lower cover 14 to the box main body 12 more stably. In result, it is possible to prevent water or dust particles from entering the electrical junction box 10 and it is also possible to lower a possibility that the electrical junction box 10 is damaged on account of a strain exerted in the locking mechanism 26.

Particularly, in the present embodiment, the electric ribs 40*a* and 40*b* protrude from the peripheral wall 18 and support wall 36 at the side portion 24*d* of the box main body 12. Thus, a contact area of the fitting projection 56 of the lower cover 14 with respect to the peripheral wall 18 and support wall 36 can be reduced. The spacing distance between the elastic ribs 40*a* and 40*b* is set to be equal to the dimension in thickness of the fitting projection piece 56. Thus, it is possible to readily insert the fitting projection piece 56 into the clearance between the elastic ribs 40*a* and 40*b* without requiring any special pressing force. Furthermore, in the present embodiment, two pairs of elastic ribs 40*a* and 40*b* are spaced apart from each other by the given distance in the longitudinal direction (in upper and lower directions in FIG. 3) of the side portion 24*d* and the fitting projection piece 56 is held at the two positions in the longitudinal direction of the side portion 52*d*, thereby ensuring a more stable holding force.

In addition, since the elastic ribs 40*a* and 40*b* bring the peripheral wall 18 and support wall 36 into a line-contact with the fitting projection piece 56, it is possible to absorb errors in dimension of the peripheral wall 18, support wall 36, and fitting projection piece 56. In addition, the support wall 36 in the present embodiment is formed by utilizing the side surface of the electrical component mounting section 16 and it is possible to hold the fitting projection piece 56 by effectively utilizing a space between the peripheral wall 18 and the electrical component mounting section 16.

As shown in FIG. 12, the staggering stopper ribs 48, 48 are disposed between the locking surfaces 46 of the locking projections 26 and the locking pieces 58 in the locking mechanisms 26 and 58. Thus, a clearance between each locking projection 26 and each locking piece 58 becomes small and the lower cover 14 can be restrained from floating up from the box main body 12, thereby effecting a stable locking condition. Particularly, since a pair of staggering stopper ribs 48, 48 are provide on both end edges of each locking projection 26, it is possible to more effectively prevent the locking piece 58 from staggering with respect to the locking projection 26. Under the locking condition of the locking mechanisms 26 and 58, the locking surface 59 of the locking piece 58 is opposed to the locking surface 46 and staggering stopper rib 48 in parallel. Since the locking surface 46 of the locking projection 26 and the staggering stopper rib 48 incline upward gradually in a releasing direction of the locking piece 58 (in a left direction in FIG. 12), a locking condition between the locking surface 46 of the locking projection 26 and the locking surface 59 of the locking piece 58 is hardly released, thereby surely maintaining the locking condition of them. Although the staggering stopper rib 48 is not always necessary in the present invention, the staggering stopper rib 48 may be provided on the locking surface 59 of the locking piece 58.

Although the embodiment of the present invention is described above in detail, it should be noted that the present invention is not limited to the embodiment. For example, the numbers of the elastic rib on a single side portion and the support wall may be determined in accordance with an inserting force and a fixing force required for the cover member. A single elastic rib may be provided on a single side portion or a plurality of elastic ribs may be provided on a single side portion.

The elastic ribs 40a and 40b that protrude from the peripheral wall 18 and support wall 36 of the box main body 12 are not always necessary. Accordingly, the fitting projection piece 56 of the lower cover 14 may be brought into face-contact with the inner peripheral surface 32 of the peripheral wall 18 and the opposed surface 38 of the support wall 36. In this case, the spacing distance between the inner peripheral surface 32 and the opposed surface 38 is set to be substantially equal to the dimension in thickness of the fitting projection piece 56 in order to ensure facilitation in insertion of the fitting projection piece 56 and a fixing force for the fitting projection piece 56.

The fitting projection piece, elastic rib, and support wall are provided on either the box main body or the cover member taking into consideration of a fitting manner between the box main body and the cover member. That is, the fitting projection piece may be provided on the box main body, and the elastic rib and support wall may be provided on the cover member. For example, an upper cover (not shown) that serves as a cover member is coupled to the box main body 12 from an upper side (an upper side in FIG. 1). The peripheral wall 18 of the box main body 12 is fitted inside the upper cover in view of waterproofing. Accordingly, the fitting projection pieces may be provided on the peripheral wall 18 of the box main body 12, the elastic ribs and support walls may be provided on the peripheral wall of the upper cover, the elastic ribs on the upper cover are pressed onto the fitting projection pieces of the box main body 12, and the fitting projection pieces may be held between the peripheral wall of the upper cover and the support walls.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain principles and practical applications of the invention, and thereby enable others skilled in the art to best utilize the invention and various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims of the present invention.

What is claimed is:

1. An electrical junction box comprising:
   a box main body that contains and holds electrical components;
   a cover member that covers an opening in said box main body;
   a locking mechanism that fits and locks peripheral walls of said box main body and said cover member on each other; and
   a fitting projection piece provided with one of said box main body and said cover member, said fitting projection piece protrudes from an end of one of said peripheral walls, and said fitting projection piece is fitted into a side of an inner peripheral surface of the other peripheral wall of the other of said box main body and said cover member, wherein
   the other of said box main body and said cover member is provided on at least a single of side portions of said other peripheral wall with said locking mechanism, and an elastic rib that protrudes from said inner peripheral surface of said other peripheral wall at said single side portion is pressed onto said fitting projection piece, and said other of said box main body and said cover member is provided on the other side portion of said other peripheral wall, which is not provided with said locking mechanism, with a support wall that is opposed to and spaced apart from said inner peripheral surface of said other peripheral wall, and said fitting projection piece is held in a space between said inner peripheral surface of said other peripheral wall and said support wall.

2. An electrical junction box according to claim 1, wherein a pair of elastic ribs that are opposed to each other are provided on said inner peripheral surface of said other peripheral wall and a surface of said support wall opposed to said other peripheral wall, and said fitting projection piece is held in a space between protruding end surfaces of said pair of elastic ribs.

3. An electrical junction box according to claim 1, wherein said locking mechanism includes a locking piece provided on one of said box main body and said cover member, and a locking projection provided on the other of said box main body and said cover member, and a staggering stopper rib is provided on locking surfaces of said locking projection and said locking piece.

4. An electrical junction box according to claim 2, wherein said locking mechanism includes a locking piece provided on one of said box main body and said cover member, and a locking projection provided on the other of said box main body and said cover member, and a staggering stopper rib is provided on locking surfaces of said locking projection and said locking piece.

* * * * *